Patented Oct. 14, 1952

2,614,124

UNITED STATES PATENT OFFICE 2,614,124

PREPARATION OF NEW UNSATURATED KETONE

Ronald Major Evans, Ickenham, and Patrick Gadsden Jones, London, England, assignors to Glaxo Laboratories Limited, Greenford, England, a British company No Drawing. Application December 4, 1951, Serial No. 259,894. In Great Britain December 19, 1950

7 Claims. (Cl. 260—586)

1

This invention is concerned with improvements in or relating to the preparation of a new unsaturated ketone namely, 6-methyl-8(1'-hydroxy-2':6':6' - trimethylcyclohex - 1' - yl) octa-3:5:7-trien-2-one which may be represented by the following structural formula:

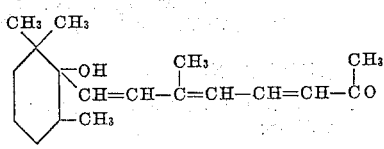

and which is useful in the synthesis of vitamin A and related compounds.

The ketone 6-methyl-8(2':6':6'-trimethylcyclohex-1'-en-1'-yl) octa - 3:5:7 - trien-2-one is known to be of use in the synthesis of vitamin A but difficulties have been encountered in its preparation; we have found that by dehydrating the herein described new ketone for example by the method set forth in copending application No. 259,737 December 3, 1951, the known ketone above referred to may be more readily obtained, and in better overall yield (from simple starting materials) than has hitherto been possible.

The herein described new compound may be readily prepared, for example, by oxidising 6-methyl-8-(1'-hydroxy - 2':6':6' - trimethylcyclohex-1'-yl) octa-3:5:7-trien-2-ol with active manganese dioxide; this carbinol may, for example be readily prepared as described in copending application No. 232,862.

The invention accordingly comprises the stated new ketone, which we have found to have the following characteristics:

Yellow viscous oil, B. P. 130°/10⁻⁴ mm.
Refractive Index, $n_D^{15°} = 1.5773$
Light Absorption (n-hexane): Max. 3110 and 2280 Å.
$E_{1\,cm}^{1\%} = 1064$ and 291
$\epsilon = 29400$ and 8000

It will be understood that the foregoing characteristics were determined for the purest material we have been able to obtain and that the characteristics of any given sample are liable to variation dependent on the purity of that sample.

According to a further feature of the invention the stated new ketone is prepared by reacting 6-methyl-8 - (1' - hydroxy - 2':6':6' - trimethylcyclohex-1'-yl) octa-3:5:7-trien-2-ol with active manganese dioxide in the presence of an inert solvent.

By the term "inert solvent" we mean an organic solvent having itself no demonstrable action on either the reactants or the products of the reaction; preferred examples of such solvents are petroleum ether, chloroform, benzene, carbon tetrachloride, acetone and dioxan. In particular, care should be taken to use a solvent which itself has no action on the manganese dioxide.

The isolation of the new ketone from the reaction mixture is preferably carried out in the presence of an anti-oxidant.

The manganese dioxide should preferably be finely divided and freshly precipitated; it should preferably be used in large excess. A particularly suitable form of manganese dioxide may be prepared as described in copending application No. 148,264.

The time required for the reaction may vary much according to the nature of the manganese dioxide and the temperature at which the reaction is carried out. Thus, for example, where a very active form of manganese dioxide is used the reaction may be carried out at room temperature in a short time, for example 30 minutes, but with other forms of manganese dioxide the time required may be several days even at elevated temperatures. We prefer to carry out the reaction at a temperature within the range of 0–80° C.

The reaction is preferably carried out in an inert atmosphere, for example in an atmosphere of nitrogen.

The reaction may for example be effected by treating a solution of the carbinol in the selected solvent with an excess of manganese dioxide; in another method of operation, a solution of the carbinol in the selected solvent is continuously percolated by mechanical means through a column of the manganese dioxide.

In order that the invention may be well understood, the following example of one method of preparing the stated new ketone is given only as an illustration:

Example

6 - methyl - 8 - (1' - hydroxy - 2':6':6' - trimethylcyclohex-1'-yl)-octa 3:5:7-trien-2-ol (7 g.) in light petroleum (B. P. 40–60° : 350 c. c.) was stirred in an atmosphere of nitrogen with manganese dioxide (70 g.) for 30 minutes. The mixture was filtered and the solid washed with petrol (350 c. c.) a trace of α-tocopherol was added as antioxidant. On evaporating the solvent a yellow gum remained (6.1 g.) $n_D^{17}$ 1.5720.

Light absorption (n. hexane): Max. at 2250 and 3130 Å., $E_{1\,cm}^{1\%}$ 340 and 925 respectively. Part of this material (4.2 g.) in petrol was chromatographed on grade II alumina. The top two-thirds of the column was extracted with ether, the solvent evaporated and the residue distilled. 6-methyl-8-(1'-hydroxy - 2':6':6' - trimethylcyclohex - 1' - yl) octa-3:5:7-trien-2-one (1.9 g.) was obtained as a yellow gum, B. P. 130°/10⁻⁴ mm. $n_D^{15}$ 1.5773 Found: C. 78.2; H. 10.4 $C_{18}H_{28}O_2$ requires C. 78.2; H. 10.2 %.

Light absorption (n-hexane): Max. at 2280 and 3110 A.; $\epsilon$8,000 and 29,400 respectively. Active hydrogen, (Zerewitinoff) 1.13 atoms of hydrogen per molecule. Unsaturation 2.91 mols of hydrogen were adsorbed per molecule of the material.

The semicarbazone separated from methanol as a yellow microcrystalline powder, M. P. 213–215°, (Found: C. 68.5; H, 9.4; N, 12.6

$$C_{19}H_{31}O_2N_2$$

requires C, 68.5; H, 9.3; N, 12.6%.

Light absorption: max. at 2350, 3250 and 3400 A.; $\epsilon$4900, 57,500 and 48,600 respectively (in alcohol).

We claim:

1. As a new compound, 6-methyl-8-(1'-hydroxy - 2':6':6' - trimethylcyclohexyl) - octa - 3:5:7-trien-2-one, represented by the formula

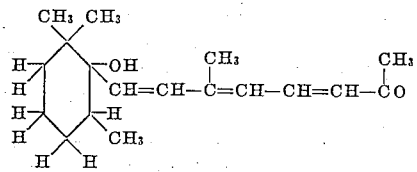

2. A process for the preparation of 6-methyl-8- (1' - hydroxy - 2':6':6' - trimethylcyclohexyl) - octa-3:5:7-trien-2-one which comprises reacting 6 - methyl - 8 - (1' - hydroxy - 2':6':6'-trimethylcyclohexyl) - octa - 3:5:7 - trien - 2 - ol with active manganese dioxide in the presence of a solvent inert to the reactants and to the products of the reaction.

3. A process as claimed in claim 2 in which the inert solvent is selected from the group consisting of petroleum ether, chloroform, benzene, carbon tetrachloride, acetone and dioxan.

4. A process as claimed in claim 2 in which the reaction is carried out at temperatures of from 0–80° C.

5. A process as claimed in claim 2 in which the reaction is carried out in an inert atmosphere.

6. A process for the preparation of 6-methyl-8- (1' - hydroxy - 2':6':6' - trimethylcyclohexyl) - octa-3:5:7-trien-2-one which comprises agitating a solution of 6-methyl-8-(1'-hydroxy-2':6':6'-trimethylcyclohexyl) - octa - 3:5:7 - trien - 2 - ol in petroleum ether with manganese dioxide at a temperature within the range of from 0–80° C. in an inert atmosphere.

7. A process for the preparation of 6-methyl-8- (1' - hydroxy - 2':6':6' - trimethylcyclohexyl) - octa-3:5:7-trien-2-one which comprises percolating a solution of 6 - methyl - 8 - (1' - hydroxy - 2':6':6' - trimethylcyclohexyl) - octa - 3:5:7 - trien-2-ol in petroleum ether through a column of manganese dioxide at a temperature within the range of from 0–80° C. in an inert atmosphere.

RONALD MAJOR EVANS.
PATRICK GADSDEN JONES.

REFERENCES CITED

The following references are of record in the file of this patent:

UNITED STATES PATENTS

| Number | Name | Date |
|---|---|---|
| 2,531,567 | Heilbron et al. | Nov. 28, 1950 |
| 2,579,658 | Evans | Dec. 25, 1951 |

OTHER REFERENCES

Heilbron et al., J. Chem. Soc. (London) 1949 vol., pp. 2023–30.

Ball et al., Biochemical Journal, vol. 42, pp. 516–523 (1948).

Chanley et al., J. American Chemical Soc., vol. 71, No. 12, pp. 4140–41 (1949).